9721X
H. Allen.
Cotton Planter.
No.
Patented Jun. 16, 1836.
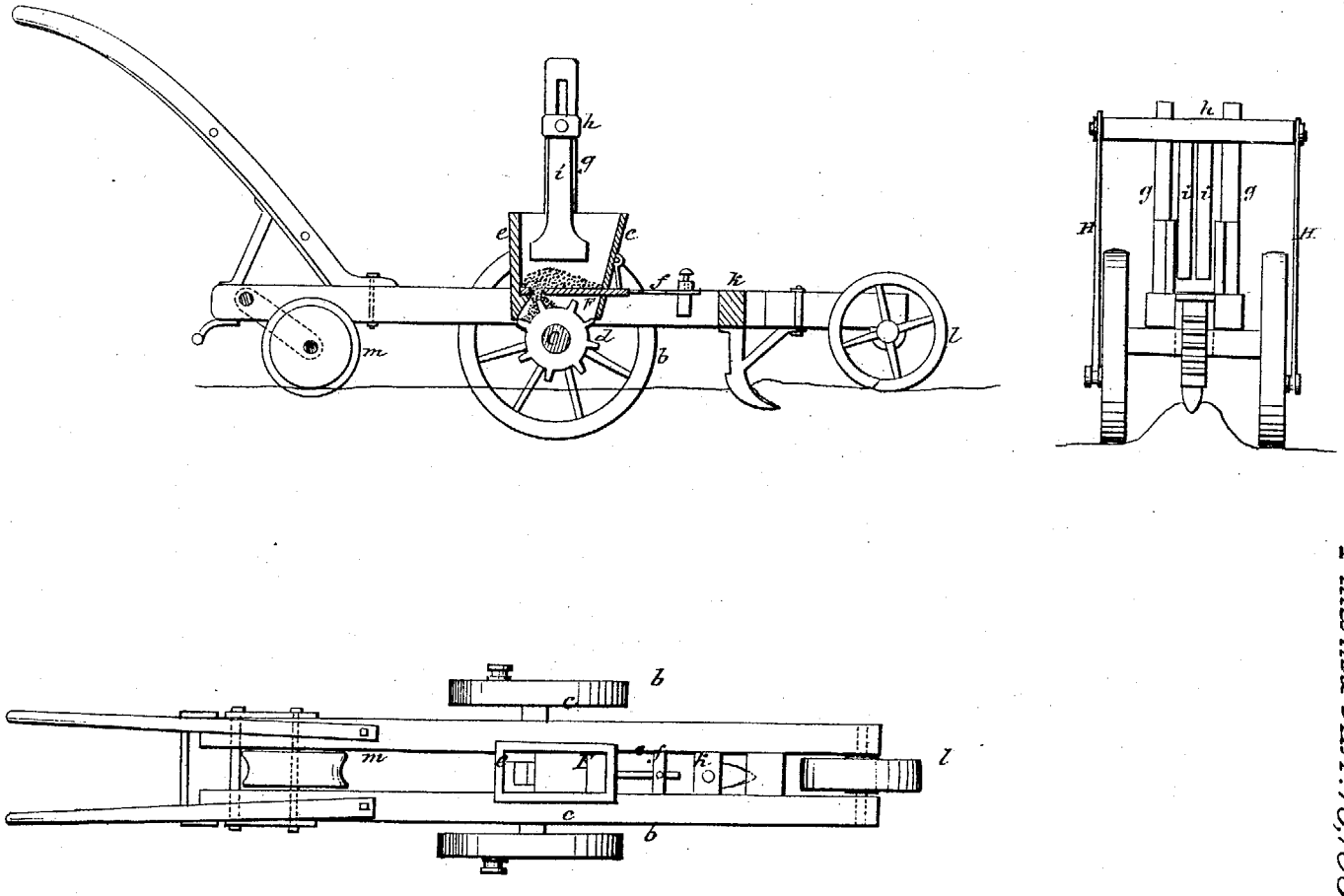
N. PETERS, PHOTO-LITHOGRAPHER, WASHINGTON, D. C.

June 16. 1836 (147)

Henry Allen of the Co of Lincoln, State of Tennessee 9721X

Letters Patent.

The schedule referred to in these Letters Patent and making part of the same, containing a description in the words of the said Henry Allen himself of his improvement in the Cotton Planter To all to whom these Presents shall come -
Be it known, that I. Henry Allen, in the county of Lincoln and state of Tennessee have invented a new and useful cotton-planter, and that the following is a full and exact description thereof -

I have a frame about seven feet long and as wide as may be deemed necessary for the ridge, about the middle of this frame are placed two wheels on the axle of which the frame rests, these wheels are about two feet in diameter and three or four inches thick and are confined to the axle which revolves with them, about the centre of this axle or shaft is placed a [illegible] teeth wheel of two or three inches thickness and about ten inches in diameter - Around this wheel I place a box or hopper as large as may be found necessary resting on the frame and so cased inside as to form an aperture for the wheel this aperture is extended two or three inches in front of the wheel, which is made to open or close at pleasure by a small rod one end confined to a regulating gate completely filling the aperture and hung above by hinges, the other end passing through a cross bar of the frame with a screw tap on either side, in this way the seed may be dropped thin or thick at pleasure, on the outside of the box or hopper are two rods or bars confined about the middle on either side, these bars or rods extend so high as to admit a cross bar sliding up and down by pitmans connected to each end, and connected to wrists on the outside of the wheels making cranks, six or eight inches long, in this cross bar are confined two or three pistons running down near - the bottom of the hopper or box, the lower end of which may be enlarged [illegible] or knuckle joints forcing the seed down upon the teeth wheel, this operation may also be performed by a conveyor working in an oblong box, under the hopper. At a convenient distance from the teeth [illegible] wheel or dropper is formed a strong cross bar in which is confined a small shovel or bulltongue that opens the ridge, another cross bar in front of this receives the brace screw bolt of the bull tongue at the front end of the frame is a revolving axle with a wheel in the centre, which barely touches the top of the ridge when the planter is in operation, when the hind end of the frame is raised the dropping ceases and the planter is carried round on the wheel to the next ridge, in the rear of the ground wheels is a cylinder ten or twelve inches in diameter which is hollowed out in the usual manner for covering the seed and breaking the clods, the cylinder is confined to the frame by two slats and a rod passing through the frame at the upper end and a rod around the frame at the lower end to assist in turning the planter—

The handles are made fast to the top of the frame braced and cross barred at a convenient hight, this machine is designed to open ridge drop the seed and cover them at one operation and may be worked by either horses or oxen.

What I claim as my invention and which I desire to secure by Letters Patent consists in the before described cotton planter.

H. Allan —

Witnesses
Madison Jeffers
Clement T. Coote

Drawing made

Ex. H.S.

[illegible]